United States Patent [19]
Hori

[11] Patent Number: 5,948,446
[45] Date of Patent: Sep. 7, 1999

[54] MOLDING APPARATUS FOR PRODUCING MOLDED RESIN PRODUCTS

[76] Inventor: Yasunori Hori, 7-6 Tomari-cho, Yokkaichi, Mie, Japan

[21] Appl. No.: 09/229,192

[22] Filed: Jan. 13, 1999

Related U.S. Application Data

[62] Division of application No. 08/966,881, Nov. 10, 1997, which is a division of application No. 08/594,818, Jan. 31, 1996, abandoned.

[51] Int. Cl.⁶ .................................................... B29C 45/16
[52] U.S. Cl. ........................... 425/130; 264/572; 425/145
[58] Field of Search ............................ 264/572; 425/130, 425/149, 145, 146, 155, 159

[56] References Cited

U.S. PATENT DOCUMENTS 5,141,682  8/1992  Steinbichler et al. .................. 264/572
5,637,328  6/1997  Shah et al. .............................. 425/130
5,639,405  6/1997  Erikson .................................... 264/572

*Primary Examiner*—Tim Heitbrink
*Attorney, Agent, or Firm*—Majestic, Parsons, Siebert & Hsue P.C.

[57] ABSTRACT

A molded resin product can be produced without shrinkage on the surface by providing a hollow part and foam cells therein. Before molten resin containing a foaming gas is introduced into a cavity between molds, the cavity is preliminarily filled with a gas with pressure high enough to prevent the foaming gas from beginning to foam or expand. While the molten resin is injected into the cavity or after its injection is over, another high-pressure gas is injected through at least one gas injection nozzles into the resin where a hollow part is desired. As the nozzle is retracted from the cavity, the high-pressure gas is removed from the cavity, allowing the foaming gas to begin to foam and expand, forming a hollow part and foam cells inside the molded product.

5 Claims, 7 Drawing Sheets

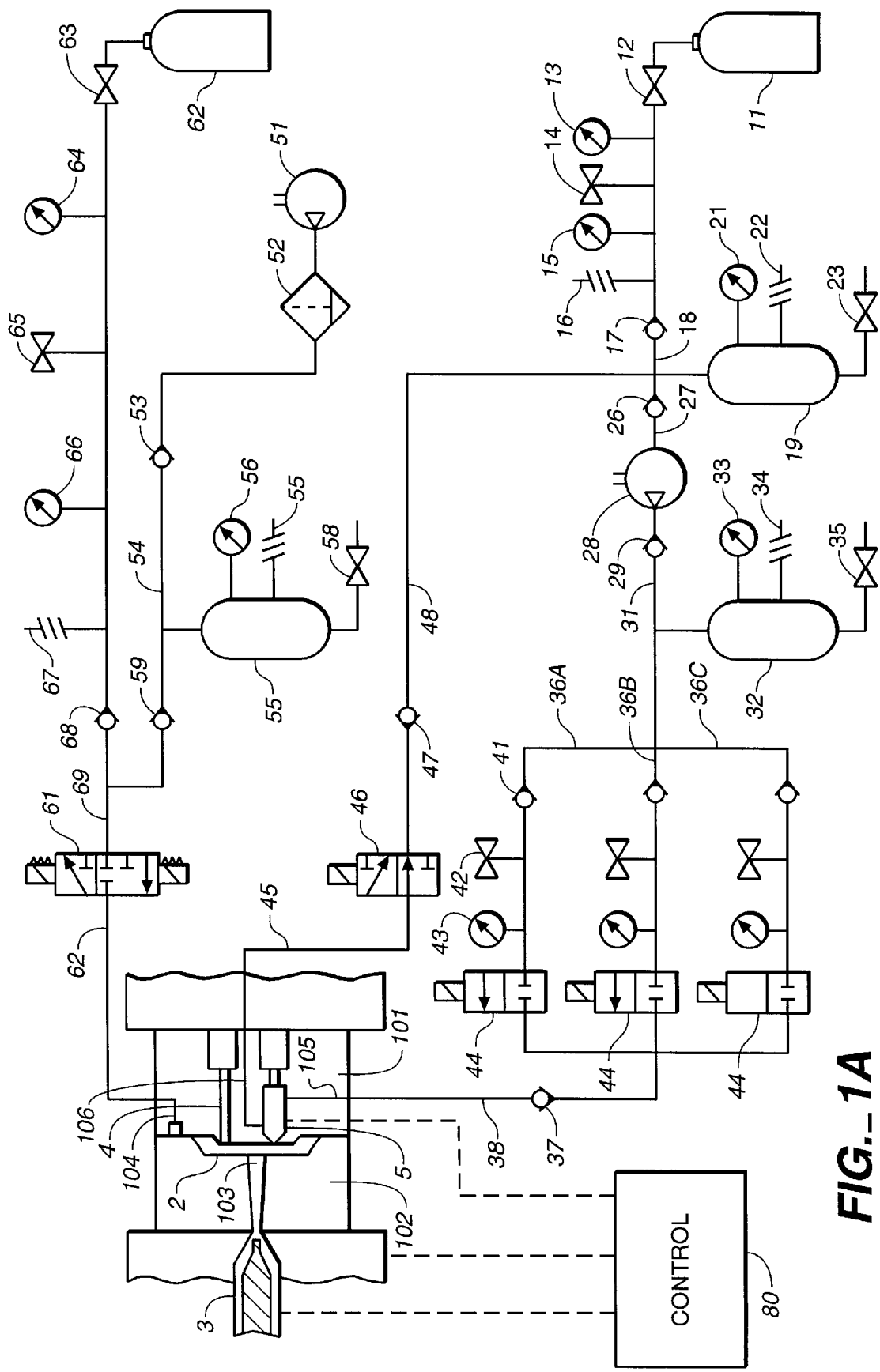
FIG._1A

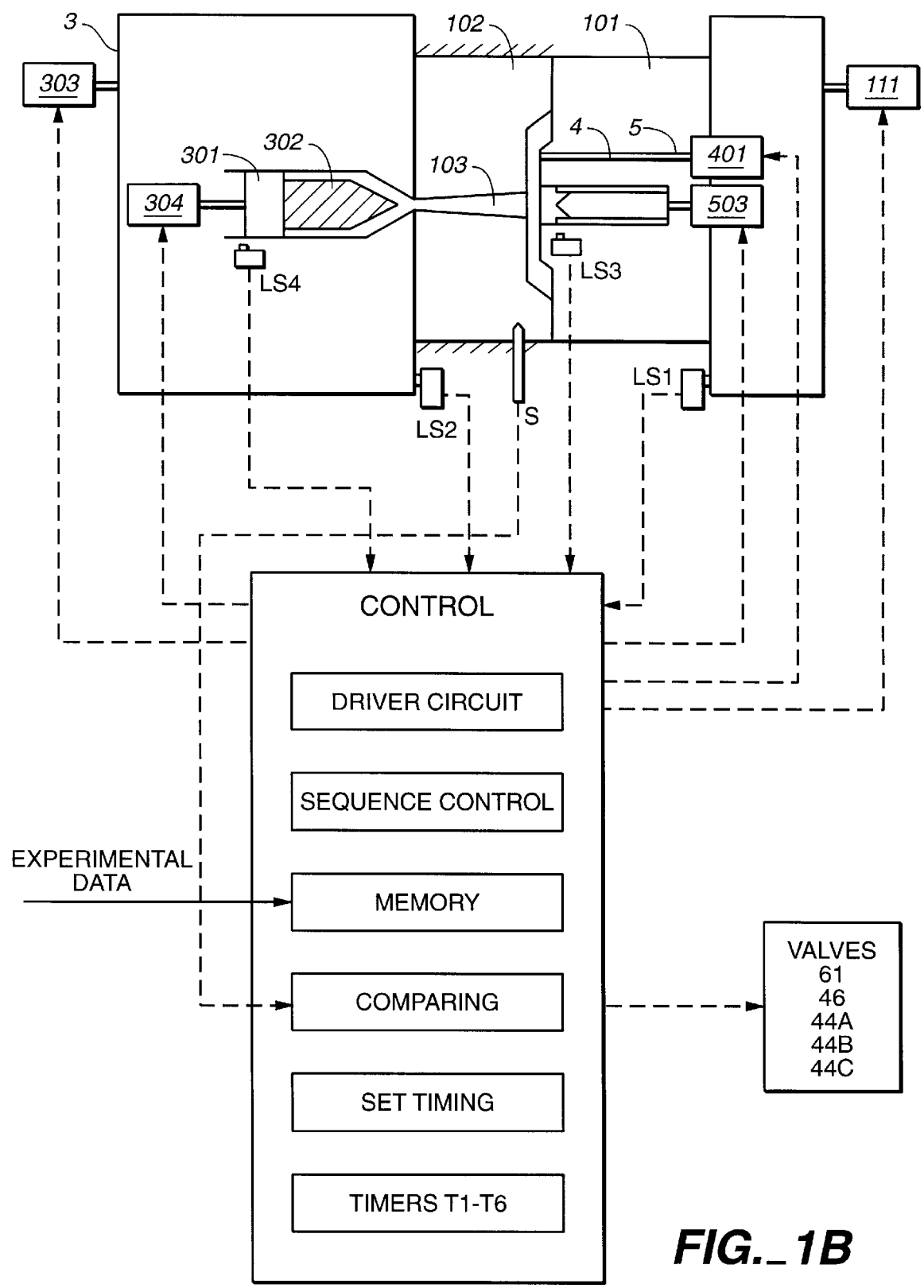
FIG._1B

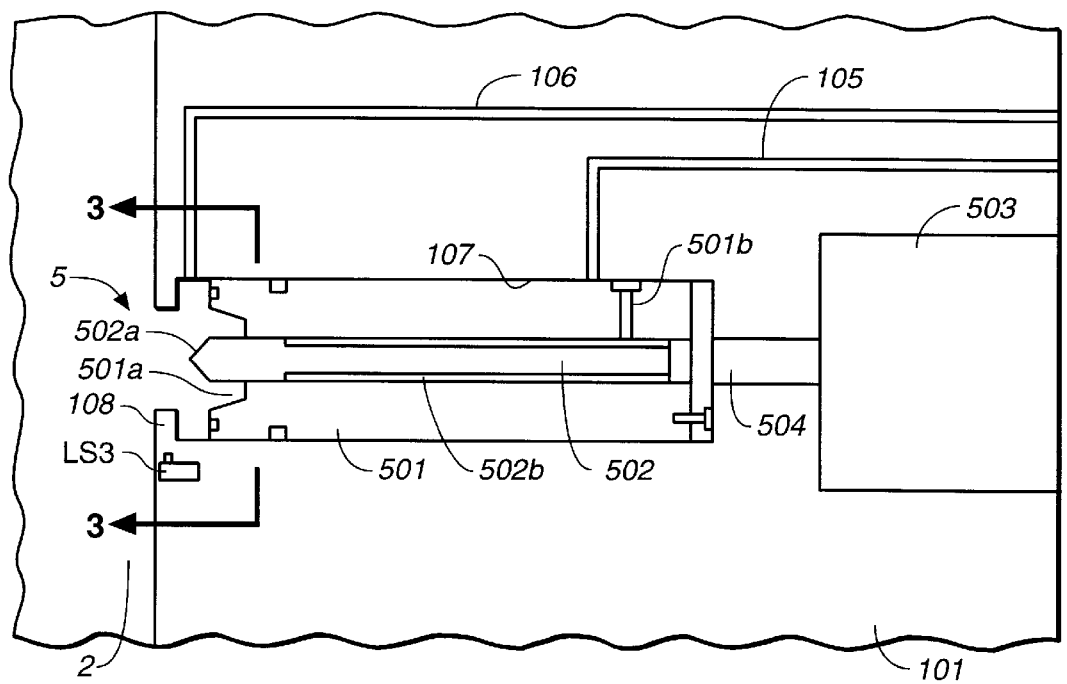
FIG._2
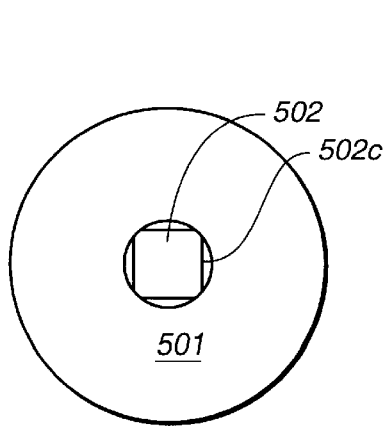
FIG._3
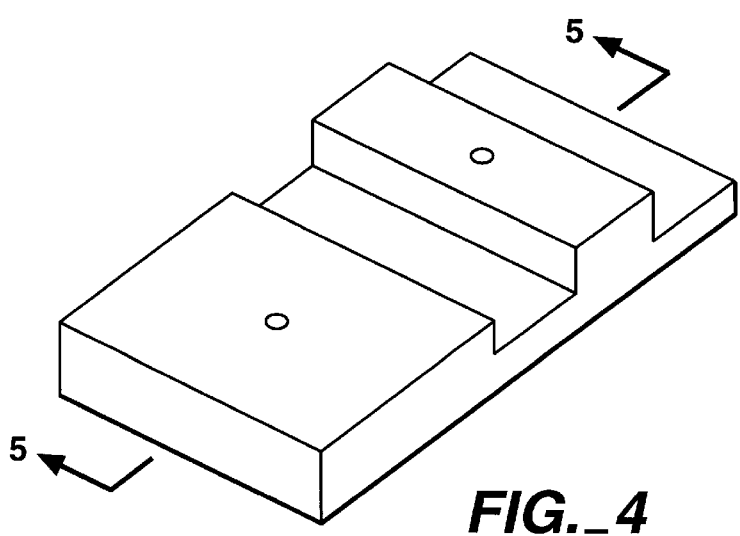
FIG._4

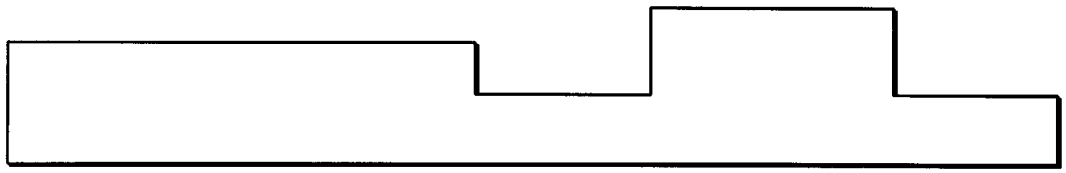
FIG._5A
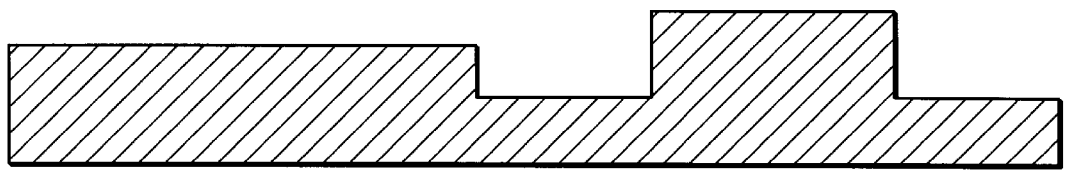
FIG._5B
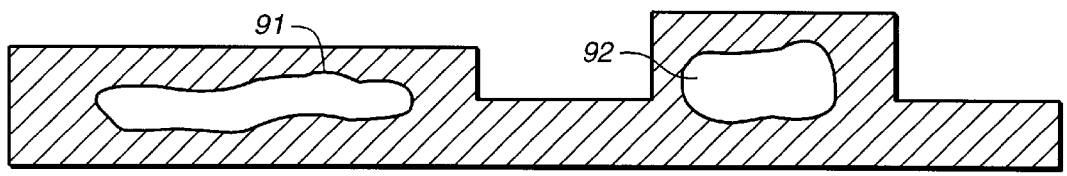
FIG._5C
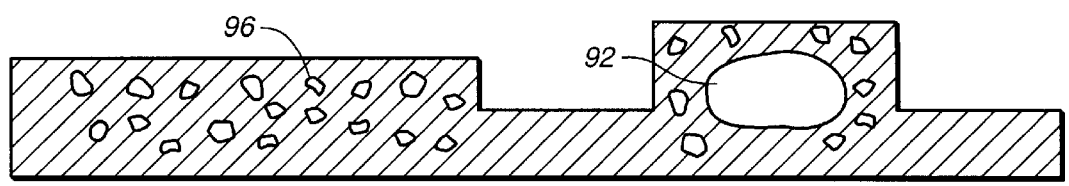
FIG._5D

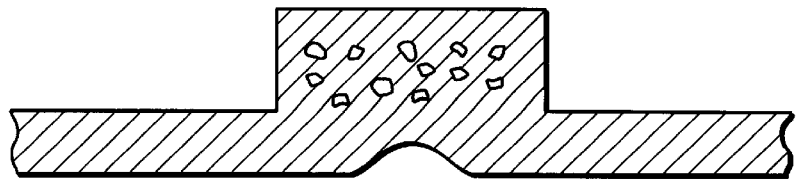
FIG._6
*(PRIOR ART)*
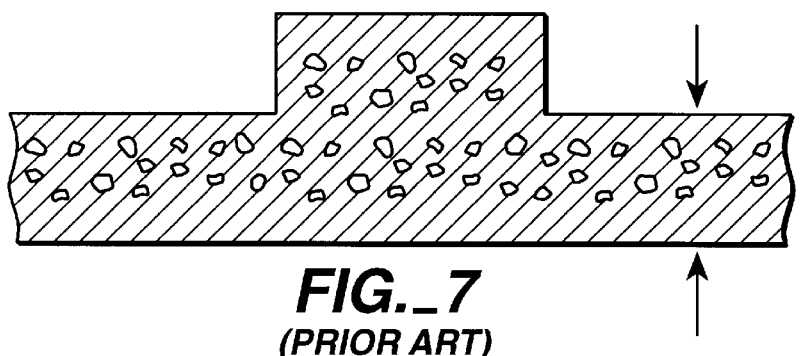
FIG._7
*(PRIOR ART)*
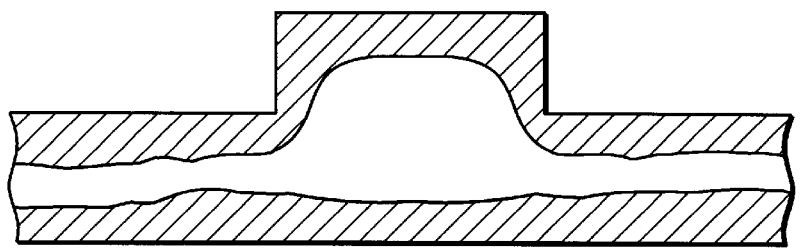
FIG._8
*(PRIOR ART)*
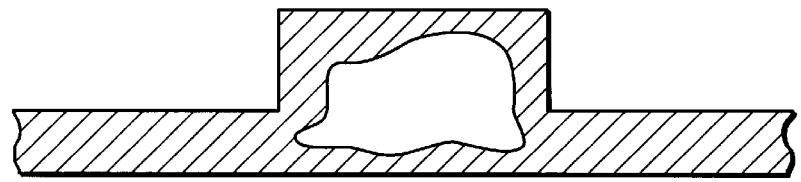
FIG._9
*(PRIOR ART)*

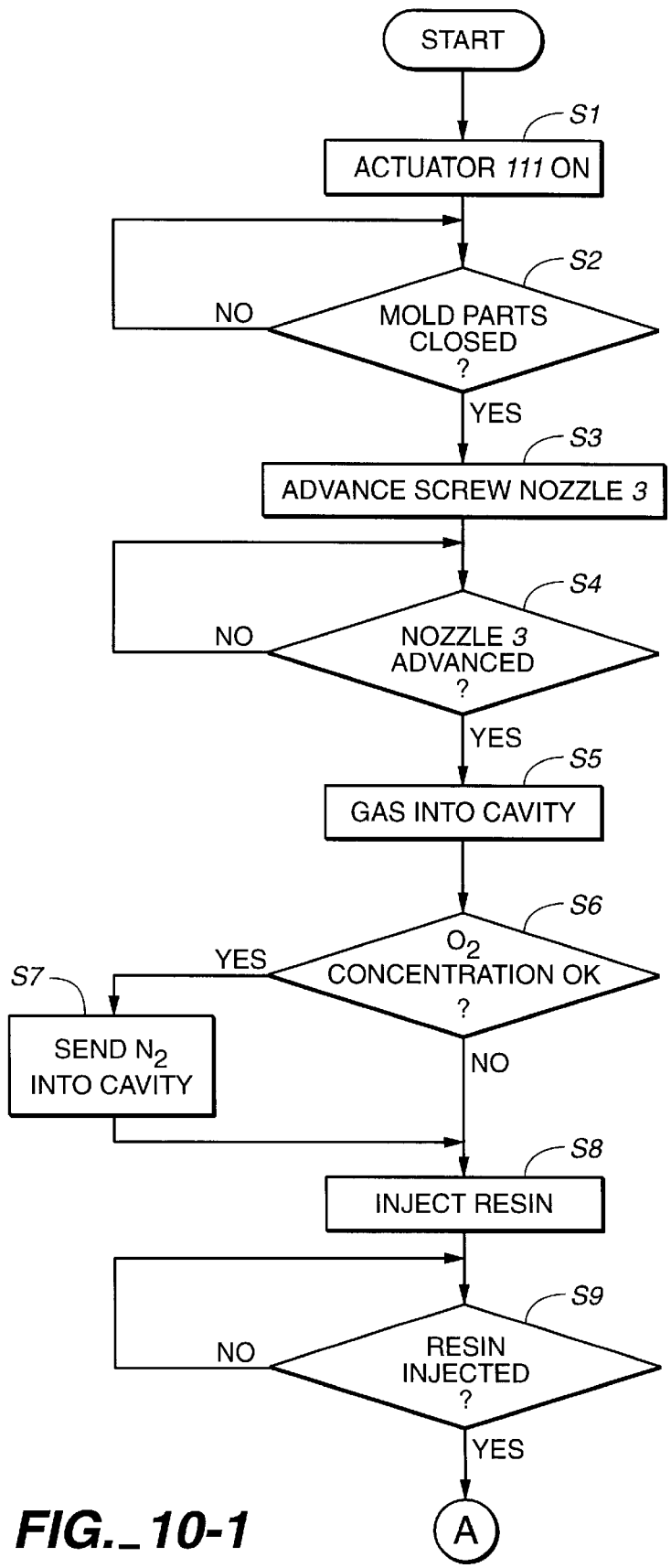
FIG._10-1

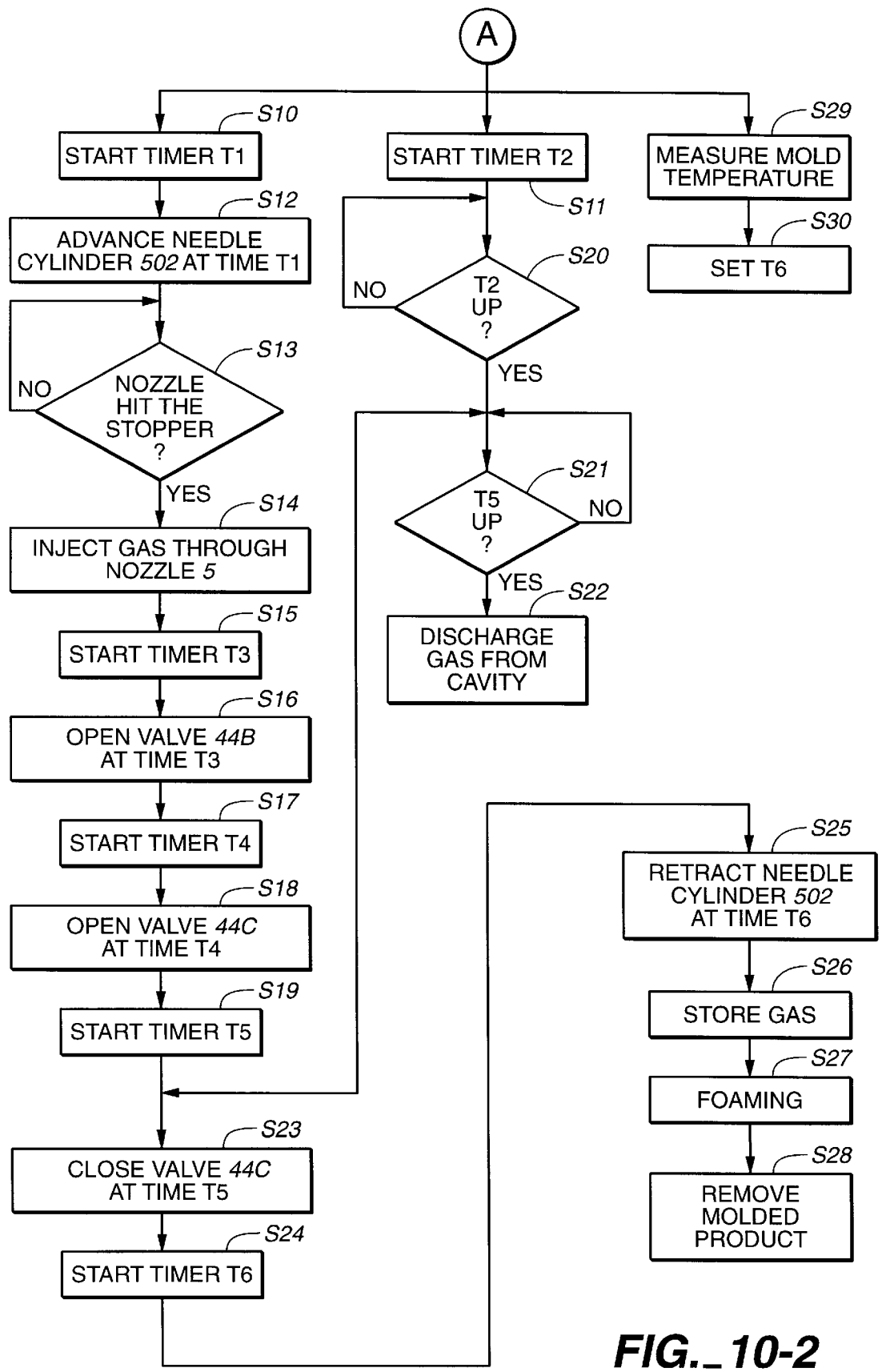
FIG._10-2

MOLDING APPARATUS FOR PRODUCING MOLDED RESIN PRODUCTS

This is a divisional of application Ser. No. 08/966,881 filed Nov. 10, 1997, which is pending and is a divisional of application Ser. No. 08/594,818 filed Jan. 31, 1996, now abandoned.

BACKGROUND OF THE INVENTION

This invention relates to a molded resin a molding apparatus for producing molded resin products by an injection molding method.

According to the so-called counter-pressure gas method, which is an example of injection molding method for producing a resin product having thick-wall parts, a gas (such as air or nitrogen gas) with pressure increased beyond the atmospheric pressure is preliminarily injected into a cavity between mold pieces before molten resin is injected thereinto. When a molten resin material having an organic solvent (such as alcohol), an inorganic liquid (such as water), an organic gas such as ($Cl_3H$), an inorganic gas (such as $N_2$, $CO_2$ and CO) or their mixture dissolved therein as a foaming agent is subsequently injected into the cavity, the foaming gas is thereby prevented from beginning to foam or expand. Only after the preliminarily injected high-pressure gas is removed from the cavity and the pressure inside the cavity is sufficiently reduced, the foaming gas begins to foam and expand inside the product being molded, thereby preventing shrinkage on its surfaces.

The so-called gas assisted injection method is another molding method whereby a cavity in a mold is fully or partially filled with a resin material by primary injection and thereafter, or while it is being injected, a gas is injected into the product being molded.

With the counter-pressure gas method, as described above, the occurrence of shrinkage is intended to be prevented by the force of foaming inside the produce being molded. Thus, the shrinkage force in skin layers on the surfaces cannot be overcome by the force of foaming unless the foaming layer is sufficiently thick (as shown in FIG. 6). In other words, products to be formed by this method are under a severe limitation regarding their shape and wall thickness. In order to obtain a molded product with a smooth surface and a foam layer inside, the wall thickness indicated by arrows in FIG. 7 must be over 5–6 mm.

By the gas assisted injection method, by contrast, it is intended to prevent the occurrence of shrinkage by the pressure of the injected gas. Without the use of any foaming agent, thick-wall parts of a product are not cooled quickly and the high-pressure gas does not effectively form any cavity inside the product being molded, as shown in FIG. 8. Instead, the gas is spread throughout the molded product, affecting adversely the strength of the product. In the case of a product having a thick rib on a thin-wall part, such as shown in FIG. 9, the thin-wall part cools quickly and the gas cannot diffuse to such a part in time, making a hollow cavity only in the rib part. Accordingly, the thickness of the wall parts should be at least about 5 mm.

SUMMARY OF THE INVENTION

It is therefore an object of this invention to eliminate the problems of prior art technology described above.

It is more specifically an object of this invention to provide an injection molding apparatus for producing injection-molded resin product having both thick-wall and thin-wall parts and fine foam cells and hollow parts formed in the thick-wall part such that occurrence of surface defects such as shrinkage is prevented.

An injection-molded product to be produced, may be characterized as having hollow parts where shrinkage would otherwise be likely to occur such as its thick-wall parts, as well as foam cells between its surface layers and these hollow parts and around the hollow parts. Throughout herein, the expression "foam cells" will be used to indicate small bubbles formed inside a molded resin product by the foaming of a forming gas during its production, and the expression "hollow parts" will be used to indicate larger cavities formed inside a molded resin product by injecting a high-pressure gas.

Before molten resin is poured into the cavity in an injection molding apparatus to produce such a product, a foaming gas is already contained in the resin material and a gas with pressure greater than the atmospheric pressure is supplied into the cavity prior to the injection of the resin material. During or after the injection of the resin material into the cavity, another high-pressure gas at pressure greater than the atmospheric pressure is injected at selected positions inside the product being molded, thereby creating hollow parts. These high-pressure gases are kept inside the cavity for a specified length of time so as to prevent the foaming gas from beginning to foam or expand prematurely. As these high-pressure gases are discharged from the cavity as well as the interior of the product being molded, the foaming gas contained in the molten resin starts to foam and expand such that foam cells are formed between the surface layers and the hollow parts, as well as around the hollow parts, of the product.

Thus, an injection molding apparatus embodying the invention may be characterized as having first gas transporting means for injecting into and discharging from the cavity between molds a compressed gas such as air or an inactive gas with a pressure greater than the atmospheric pressure (referred to as "the counter-pressure gas"), a first detecting means for detecting the timing for activating the first gas transporting means, one or more forwardly and backwardly mobile gas injection nozzles each at a selected position corresponding to where a hollow part is desired in the product being molded by injecting thereinto air or an inactive gas at pressure greater than the atmospheric pressure (referred to as "the hollowness-creating gas"), driving means for moving these gas injection nozzles forward or backward, a second detecting means for detecting the timing for activating this driving means, a second gas transporting means for supplying the hollowness-creating gas to the gas injection nozzle (or nozzles), a third detecting means for determining the timing of activating the second gas transporting means, gas removing means which becomes connected to the cavity by the movement of the gas injection nozzle (or nozzles) for removing the high-pressure gas from the cavity, and a control means for activating the gas transporting and removing means and the driving means in a coordinated manner such that a foaming gas contained in the molten resin material causes the formation of foam cells and hollow parts in the product to be molded. The second gas transporting means is preferably able to control the gas pressure therethrough in a plurality of stages. In the detailed description of the invention below, the detecting means will be considered to be parts of the control means and treated together for the convenience of disclosure.

After the counter-pressure gas is sent into the cavity through the first gas transporting means, molten resin with a foaming gas dissolved therein is injected into the cavity through an injection screw and the hollowness-creating gas is correspondingly introduced into selected parts of the product to be molded through the second gas transporting means, the counter-pressure gas being discharged either beforehand or thereafter. After hollow parts are formed inside the product being molded, the hollowness-creating gas is removed from the cavity by activating the gas removing means to retract the gas injection nozzle (or nozzles). When the pressure inside the cavity and the product being molded becomes lower than the atmospheric pressure, the foaming gas begins to foam and expand, creating foam cells between the surfaces and the hollow parts, as well as around the hollow parts, of the molded product.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1A is a drawing for showing gas flow routes within a molding apparatus embodying this invention, and FIG. 1B is a drawing for showing a portion of FIG. 1B more in detail, FIGS. 1A and 1B together being sometimes referred to as FIG. 1;

FIG. 2 is a schematic sectional view of a gas injection nozzle;

FIG. 3 is a sectional view taken along line 3—3 of FIG. 2;

FIG. 4 is a diagonal external view of a product obtained by using the apparatus shown in FIGS. 1–3 according to this invention;

FIGS. 5A, 5B, 5C and 5D are sectional views of the product of FIG. 4 taken along the line 5—5 in FIG. 4, FIG. 5A showing its outline, FIG. 5B being a view immediately after the injection of the resin containing foaming agent, FIG. 5C being a view after the injection of the hollowness-creating gas, and FIG. 5D being a view after the counter-pressure and hollowness-creating gases have been discharged;

FIG. 6 is a sectional view of a shrinkage on the surface of a molded product with a thick-wall part produced by a prior art method;

FIG. 7 is a sectional view of a molded prior art product with a thick-wall part without any shrinkage;

FIG. 8 is a sectional view of a generally thick molded prior art product with a hollow part formed with the injection of a high-pressure gas;

FIG. 9 is a sectional view of a molded prior art product with a thin-wall part and a hollow part by the injection of a high-pressure gas; and FIG. 10-1 and 10-2 are is a flow chart of the operation of the molding apparatus of FIG. 1.

DETAILED DESCRIPTION OF THE INVENTION

FIGS. 1–3 will be referenced first to describe a molding apparatus embodying this invention. As shown in FIG. 1, a cavity 2 in the form of a molded resin product to be obtained is provided between the contacting surfaces of a mobile mold part 101 connected to a hydraulic actuator 111 and a stationary mold part 102 such that a product of the desired shape can be obtained by injecting molten resin thereinto at a high pressure. An injection passageway 103 is provided at the center of the stationary mold part 102 such that the injection screw nozzle 3 of a known type can be pushed forward at the time of a molding operation and be connected to the opening to the passageway 103. The injection screw nozzle 3 contains therein a piston 301 which can be moved longitudinally forward and backward by means of an actuator 304 and is provided with a helically threaded peripheral surface 302 so as to be able to rotate by means of a motor (not shown). The mobile mold part 101 is provided with one or more gas injection nozzles 5 (only one being shown in FIGS. 1A and 1B) which are for injecting a high-pressure gas (referred to as "the hollowness-creating gas"), corresponding to positions where surface shrinkage is likely to occur on the molded product, and can be advanced or retracted longitudinally by means of another hydraulic actuator 503, an ejector 4 adapted to be activated by still another hydraulic actuator 401 to eject the molded product out of the mold parts, a counter-pressure gas route 104, a gas supply route 105 to the gas injection nozzles 5, and a return route 106 from the gas injection nozzles 5. An O-ring is inserted between the contact surfaces of the mold parts 101 and 102, and there is a gap for passing only a gas from the counter-pressure gas route 104 to the cavity 2. Additionally, there are provided several detecting means including a detector switch LS1 for detecting the position of the mobile mold part 101 where it contacts the stationary mold part 102, another detector switch LS2 for detecting the position of the injection screw nozzle 3 where it has reached the injection passageway 103, a still another detection switch LS4 for detecting the position of the piston 301 of the injection screw nozzle 3 indicative of the end of the injection of resin, and temperature sensor S for measuring the temperature of the mold on the side of the stationary mold part 102.

Next, the system for supplying the hollowness-creating gas to the gas supply route 105 will be explained. A high-pressure gas container 11 containing nitrogen gas (normally at pressure of about 150 kg/cm$^2$) is connected to a reserve tank 19 through a manually operable valve 12 and a flow route 18 containing a pressure gauge 13, a pressure control valve 14, another pressure gauge 15, a safety valve 16 and a check valve 17. The reserve tank 19 is provided with a pressure gauge 21, a safety valve 22 and a manually operable discharge valve 23 leading to a drain. The nitrogen gas, which is temporarily stored in the reserve tank 19, is supplied through a check valve 26 and a flow route 27 into a diaphragm pump 28. After it is compressed thereby to a higher pressure (maximum 500 kg/cm$^2$), it is passed through a check valve 29 and a flow route 31 and is stored in a high-pressure reserve tank 32.

The high-pressure reserve tank 32 is provided with a pressure gauge 33, a safety valve 34 and a manually operable valve 35 leading to a drain. The high-pressure gas stored in this high-pressure reserve tank 32 passes through three parallel-connected circuits 36A, 36B and 36C for controlling pressure in three stages, being connected to the gas supply route 105 through a check valve 37 in a flow route 38. Each of these parallel-connected circuits 36A, 36B and 36C includes, in order from the side of the high-pressure reserve tank 32, a check valve 41, a pressure control valve 42, a pressure gauge 43 and an electromagnetic switch valve 44 (or 44A, 44B and 44C, corresponding respectively to the circuits 36A, 36B and 36C).

The return route 106 is connected to the reserve tank 19 through a route 45, an automatic valve 46, and another return route 48 containing a check valve 47.

Next, the system for sending a compressed gas such as air or an inactive gas with a pressure greater than the atmospheric pressure (referred to as "the counter-pressure gas" into the cavity will be described. High-pressure air from an air compressor 51 (normally at a pressure greater than the atmospheric pressure such as 30 kg/cm$^2$) is introduced into another reserve tank 55 through a circuit 54 including a filter 52 and a check valve 53. The reserve tank 55 is provided with a pressure gauge 56, a safety valve 57 and a manually operable valve 58 leading to a drain and is connected to the counter-pressure gas route 104 through a check valve 59 and a three-way electromagnetic valve 61.

A high-pressure nitrogen gas container 62 is connected to an electromagnetic three-way switch valve 61 for reducing the oxygen concentration inside the cavity 2 through another gas flow route 69 containing a manually operable valve 63, a pressure gauge 64, a pressure control valve 65, another pressure gauge 66, a safety valve 67 and a check valve 68. The high-pressure nitrogen gas container 62 may be replaced by a device for generating nitrogen gas such as a liquid nitrogen evaporator provided with a booster or the like for maintaining the gas pressure at a certain elevated level higher than that by the air compressor 51. These devices may also be used as a combination.

More than one gas injection nozzles 5 may be provided, depending on the shape of the product to be molded, where surface shrinkage is likely to occur and hence it is desired to form a hollow part. As shown more in detail in FIG. 2, each gas injection nozzle 5 is in the form of a needle-containing throughhole 107 in the mobile mold part 101 with an opening on the contact surface abutting the cavity 2 at a position corresponding to a thick-wall portion of the product to be molded. A needle cylinder 502 with a conic front end part 502a is fastened to the hollow interior of a tubular outer cylinder 501 so as to be freely slidable inside the throughhole 107, and a step 108 for providing a smaller opening diameter is formed and serves as a forward stopper for the outer cylinder 501 of the needle cylinder 502. A detector switch LS3 is provided for the contact of the outer cylinder 501 with the step 108. The outer cylinder 501 has a front end indentation 501a on its end surface facing the cavity 2, and is fastened to the needle cylinder 502 with a flange such that its conic front end part 502a protrudes forward from its front end indentation 501a. The outer cylinder 501 is connected to the forward end of a piston rod 504 of a hydraulic actuator 503 and is adapted to be retracted backward thereby.

The needle cylinder 502 has a center part with a space 502b having a reduced inner diameter. Its front end is provided, as shown in FIG. 3, with four slits 502c on its outer circumference such that a pressured gas can pass therethrough in the axial direction although molten resin cannot. A radially extending flow route 501b is provided through the outer cylinder 501 such that, when the outer cylinder 501 is at its most forwardly advanced position, this flow route 501b connects to the gas supply route 105. The return route 106 through the mobile mold part 101 has an opening behind the step 108 but in front of the front end of the outer cylinder 501 when the latter is in the retracted position (shown in FIG. 2) so as to connect to the cavity 2. O-rings are provided where the outer cylinder 502 contacts the step 108 and slides against the inner wall of the throughhole 107 for preventing gas to flow thereacross.

A control unit for controlling the overall operation of the entire apparatus is schematically indicated at 80 in FIGS. 1A and 1B. The control unit 80 includes a driver circuit 81 for controlling the operations of the various hydraulic actuators 111, 303, 304, 401 and 503, a sequence control circuit 82 (to be described below more in detail) and timers T1–T6 for determining the timing at which various valves are to be operated. The timer T6 relates to the relationship between the temperature of the stationary mold part 102 and the timing for the removal of the hollowness-creating gas in order to cause the foaming agent to start foaming. This relationship is experimentally determined and manually inputted (through an inputting means which is not shown in FIG. 1) into a memory circuit 83. The mold temperature measured by the temperature sensor S is compared by a comparing circuit 84 with this relationship, and the timing for the timer T6 is set accordingly by a timing-setting circuit 85. The memory circuit 83, the comparing circuit 84 and the timing-setting circuit 85 may also be considered parts of the control unit 80.

Although only one gas injection nozzle 5 is shown in FIG. 1 for the convenience of disclosure, one or more of such nozzles 5 are provided to the mobile mold part 101 corresponding to a thick-wall part of the product to be molded. Pellets of a thermoplastic resin material, such as vinyl chloride, polycarbonate, styrene grated polyphenylene ether, polystyrene, acrylonitrile butadiene styrene (ABS) copolymer resin (ABS), high-impact polystyrene, styrene modified polyphenylene oxide and polypropylene, are thrown inside a heating cylinder (not shown) together with a foaming gas such as $N_2$ and a hydrocarbon gas, and a foaming agent such as inorganic agents like sodium bicarbonate, ammonium bicarbonate and sodium boron hydride and organic agents like azodicarbon amide (ADCA) to cause a physical or chemical reaction such that the pellets are melted by the heat generated thereby. The resin density is increased by applying a back pressure and the gas from the foaming agent is simultaneously caused to be dissolved.

The three parallel-connected circuits 36A, 36B and 36C may, for example, be adapted to provide a lower pressure, a medium pressure and a higher pressure. Since the time required for molten resin to start solidifying depends on the temperature of the mold parts 101 and 102 with which it comes into contact, the functional relationship between the temperature of the stationary mold part 102 as one would obtain by the temperature sensor S and the timing of molten resin to solidify is preliminarily determined experimentally, and this experimentally obtained relationship is stored in the memory circuit 83 through an input means (not shown). Depending upon the situation, two or all of the three pressure levels to be provided by the three parallel-connected circuits 36A, 36B and 36C may be equal, and the relative magnitude of the pressure levels in the three flow routes 36A, 36B and 36C may not necessarily be as described above.

Next, the basis operation of the apparatus will be explained with reference to the flow chart shown in FIG. 10. When the molten resin is ready to be injected, the hydraulic actuator 111 is activated (S1) in response to a command from the driver circuit 81. When the detector switch LS1 detects that the two mold parts 101 and 102 have closed (YES in S2), the driver circuit 81 of the control unit 80 activates the hydraulic actuator 303 to thereby advance the screw nozzle 3 towards the passageway 103 (S3). If the detector switch LS2 detects that the screw nozzle 3 has come into contact with the opening to the passageway 103 (YES in S4), a compressed gas (with pressure greater than the atmospheric pressure) serving as the counter-pressure gas is sent into the cavity 2 (S5) by activating the air compressor 51 to initially store compressed air (with maximum pressure of 25 kg/cm$^2$, which is greater than the atmospheric pressure) inside the reserve tank 55, opening the electromagnetic three-way switch valve 61 in response to a command from the sequence control circuit 83 of the control unit 80 to connect the routes 54 and 62 together such that the counter-pressure gas is sent into the cavity 2 from the flow route 104 of the mold part 101 through the gap between the contact surfaces of the mold parts 101 and 102. When it is necessary to reduce the oxygen concentration inside the cavity 2 (YES in S6), the manually operable valve 63 is opened by controlling the pressure of the inactive nitrogen gas from the high-pressure nitrogen gas container 62 by the pressure control valve 65 to thereby introduce this nitrogen gas into the cavity 2 (S7). Instead of nitrogen, use may be made of Ar, $CO_2$, CO and other non-combustible gases.

Next, actuator 304 is activated to advance the piston 301 of the injection screw nozzle 3 in response to a command from the driver circuit 81 of the control unit 80, thereby injecting molten resin with a foaming gas dissolved therein into the cavity 2 (S8). Either the resin is injected into the cavity 2 so as to completely fill it or an amount which is slightly less than the volume of the cavity 2 is injected. The foaming of the foaming gas, as well as its expansion, is controlled with the help of the counter-pressure gas. The completion of the injection of the molten resin or the filling of the cavity 2 is detected, for example, physically from the distance traveled by the injection screw nozzle 3 or electrically by means of the detector switch LS4 (YES in S9), and the timers T1 and T2 are started thereupon (S10 and S11).

The timer T1 controls the timing and thereby the operation of the hydraulic actuator 503 to move forward (towards the cavity 2) the outer cylinder 501 of the needle cylinder 502 (S12) until the detector switch LS3 detects that it has reached its forwardly advanced position in contact with the step 108 serving as a stopper (YES in S13). A high-pressure gas such as air, $N_2$, Ar or $CO_2$ at a pressure greater than the atmospheric pressure is injected (S14) through the gas injection nozzles 5 (to serve as the hollowness-creating gas), while the $N_2$ gas from the gas container 11, with its pressure adjusted to 10–30 kg/cm$^2$ by the pressure control valve 14, is transported through the flow route 18 and temporarily stored in the reserve tank 19. Its pressure is then further increased by the diaphragm pump 28 to a maximum value of 500 kg/cm$^2$, and it is next stored in the high-pressure reserve tank 32. Three levels of pressure are prepared in the flow routes 36A, 36B and 36C by means of their respective pressure control valves 42, depending on the size and the shape of the product to be molded. For example, the first flow route 36A may be used to prepare a low gas pressure for injecting the gas into the interior of the product being molded, the second flow route 36B may be for preparing a middle gas pressure for causing the gas to expand inside the product, and the third flow route 36C for preparing a high gas pressure for preventing the foaming gas in the dissolved state from beginning to foam or expand.

The electromagnetic switch valve 44A of the first flow route 36A is opened first in response to a command from the control unit 80 and the timer T3 is started (S15). When a preset time interval (also indicated as T3), determined by the nature of the product being molded, has been counted thereby, the electromagnetic switch valve 44B in the second flow route 36B is opened by a command from the control unit 80 (S16) and the timer T4 is started (S17). When another time interval T4, also predetermined according to the nature of the product being molded, has been counted by the timer T4, the electromagnetic switch valve 44C in the third flow route 36C is opened by a command from the control unit 80 (S18) and the timer T5 is started (S19). As explained above, however, the relative pressure in the three flow routes 36A, 36B and 36C need not be determined as in this example. For example, the pressure level in the third flow route 36C may be between those in the first and second flow routes 36A and 36B.

The compressed nitrogen gas, passing through the flow route 38 to serve as the hollowness-creating gas, is injected into the product being molded through the gas supply route 105 in the mobile mold part 101, the flow route 501b through the outer cylinder 501, the space 502b inside the needle cylinder 502 and its four slits 502c. The surface of the thick-wall parts of the product being molded is cooled by the mold parts 101 and 102 and quickly becomes solid, but the interior of the product solidifies more slowly and is still in the molten condition when the compressed gas is injected into this portion of the product being molded so as to form a hollow part and to absorb the shrinkage that would occur by the cooling. The time (T5 set by the timer T5) required for the injection of the compressed hollowness-creating gas depends on the shape of the product being molded but it is usually on the order of several seconds to several tens of seconds.

The counter-pressure gas, earlier introduced into the cavity 2 as described above, is discharged therefrom by activating the three-way switch valve 61 to open the flow route 62 to the atmosphere (S22), in response to a command from the control unit 80, either before or after the injection of the resin material is completed (according to the timing set by the timers T2 and T5 (YES in S20 and S21)). At the same time, flow routes 69 and 54 are closed, the valve 44C is closed (S23) and the timer T6 is started (S24).

As explained above, the time interval T6 to be counted by the timer T6 is determined (S30) by the comparing circuit 84 which compares the temperature measured by the temperature sensor S (S29) and the information stored in the memory circuit 83 of the control unit 80. When this time T6 is counted by the timer T6, the hydraulic actuator 503 is activated to move the outer cylinder 501 (and hence also the needle cylinder 502) backwards (that is, away from the cavity 2) (S25) so as to open the return path 106 to the interior of the throughhole 107, and the electromagnetic switch valve 46 is activated at the same time such that the compressed gas in the cavity 2 is guided through the flow paths 108, 45 and 48 into the reserve tank 19 and stored therein (S26).

With the counter-pressure gas and the hollowness-creating gas thus discharged, the foaming gas, which has hitherto been prevented thereby from foaming and expanding begins to foam and expand to form a hollow part and foam cells and to thereby counteract the volume shrinkage (S27). After another preset time period has been counted, the hydraulic actuators 111, 303 and 504 are activated by commands from the control unit 80 to open the mold parts 101 and 102, and the actuator 401 is operated to take out the molded product (S28). The discharge of the counter-pressure gas may be effected either before, after or simultaneously with the injection of the hollowness-creating gas. Similarly, the injection of the hollowness-creating gas need not be effected after the injection of the resin material but may be started while the resin material is being injected. The timing of the injection may be controlled, for example, by the same detector which detects the position of the injection screw nozzle 3. These choices are to be made, depending on the shape of the product to be molded. If an inactive gas is used instead of air as the counter-pressure gas, it may be collected after discharge.

As an example, a product with the shape shown in FIGS. 4 and 5A was molded by using acrylonitrile butadien styrene copolymer resin and an injection molding apparatus with capacity of 120t. Molten resin with an addition by 0.1% of azo-dicarbon amide (ADCA) as foaming agent was used. Nitrogen gas at pressure 18 kg/cm$^2$ was injected into the cavity 2 as the counter-pressure gas. A hollowness-creating gas at pressure 50 kg/cm$^2$ was injected over a period of 5 seconds into the product being molded at two positions. FIG. 5B shows the condition of the product after the resin material has been injected into the cavity. The counter-pressure gas was discharged simultaneously, and a hollowness-creating gas was injected to form hollow parts 91 and 92 as shown in FIG. 5C. When the hollowness-creating gas was discharged 5 seconds later, one of the hollow parts (91) disappeared because the force of foaming was stronger than the force associated with the shrinkage, there being left a foam layer 96 as shown in FIG. 5D. Around the other of the hollow parts (92), however, the shrinkage force was sufficiently strong such that the hollow part 92 was left without collapsing. Thus, there was no shrinkage detectable externally. The foaming multiplicity was about 5% and the ratio of hollowness reached the value of 3%.

In summary, defects caused by shrinkage are successfully prevented from appearing on the surface, especially of thick-wall parts of a molded product, because the force associated with the shrinkage is counter-acted by forming foam cells and hollow parts which serve to absorb the force of shrinkage. Thus, molded products with smooth surfaces can be obtained and the yield of high-quality molded products can be improved. Since many foam cells, instead of hollow parts, are formed throughout the molded product, the overall strength of the product is also improved. Such products not only have improved heat insulation and noise eliminating properties but also can provide better cushioning effects and hence have better shock resistance.

Although the invention was described above with reference to only one example, this is not intended to limit the scope of the invention. Many modification and variations are possible, for example, in the control system of the apparatus by using different sets of detectors and timers to appropriately control the timing at which different flow routes of the gases are opened and closed. Thus, the control unit 80 is only schematically illustrated in FIG. 1 and its connection by dotted lines should be only broadly interpreted.

What is claimed is:

1. An apparatus for producing a molded resin product, said apparatus comprising:
   mold parts forming a cavity inside;
   resin-injecting means for injecting into said cavity, molten resin containing a foaming gas;
   first gas transporting means for causing a counter-pressure gas with pressure above the atmospheric pressure to be injected into and discharged from said cavity;
   at least one gas injection nozzle for injecting a hollowness-creating gas with pressure above the atmospheric pressure at a selected position corresponding to a hollow part intended to be formed in said product;
   second gas transporting means for causing said hollowness-creating gas to be transported to said gas injection nozzle to be thereby injected into said cavity;
   third gas transporting means for removing said hollowness-creating gas from said cavity; and
   control means for controlling operations of said first, second and third gas transporting means in a mutually coordinated manner so as to produce inside said cavity a molded resin product with both a hollow part and foam cells.

2. The apparatus of claim 1 wherein said control means is adapted to move said gas injection nozzle between a forward position, thereby allowing said second gas transporting means to cause said hollowness-creating gas to be injected into said cavity, and a retracted position, thereby causing said third gas transporting means to remove said hollowness-creating gas to be removed from within said cavity.

3. The apparatus of claim 2 wherein said control means is adapted to start injection of said hollowness-creating gas through said second gas transporting means and said gas injection nozzle according to the position of said resin-injecting means with respect to said mold parts.

4. The apparatus of claim 1 wherein said first gas transporting means include means for controlling the oxygen concentration of said counter-pressure gas.

5. The apparatus of claim 2 wherein said second gas transporting means include means for controlling the pressure of said hollowness-creating gas.

* * * * *